United States Patent
Sugiyama

(10) Patent No.: US 9,557,624 B2
(45) Date of Patent: Jan. 31, 2017

(54) OPTICAL MODULATOR AND OPTICAL TRANSMITTER

(71) Applicant: FUJITSU OPTICAL COMPONENTS LIMITED, Kawasaki-shi, Kanagawa (JP)

(72) Inventor: Masaki Sugiyama, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 14 days.

(21) Appl. No.: 14/588,684

(22) Filed: Jan. 2, 2015

(65) Prior Publication Data

US 2015/0117867 A1    Apr. 30, 2015

Related U.S. Application Data

(63) Continuation of application No. PCT/JP2012/069010, filed on Jul. 26, 2012.

(51) Int. Cl.
G02F 1/225    (2006.01)
G02F 1/03    (2006.01)
H04B 10/50    (2013.01)

(52) U.S. Cl.
CPC ............ *G02F 1/225* (2013.01); *G02F 1/0316* (2013.01); *H04B 10/501* (2013.01); *G02F 2201/05* (2013.01)

(58) Field of Classification Search
USPC .............................................. 398/182; 385/8
See application file for complete search history.

(56) References Cited

U.S. PATENT DOCUMENTS

| 5,289,551 A | 2/1994 | Nakama et al. |
| 2009/0009259 A1* | 1/2009 | Ohira ...................... G02F 1/225 332/119 |
| 2009/0034898 A1* | 2/2009 | Kawano ................ G02F 1/2255 385/2 |
| 2011/0129236 A1 | 6/2011 | Jeong |

(Continued)

FOREIGN PATENT DOCUMENTS

| JP | 4-172308 | 6/1992 |
| JP | 5-93891 | 4/1993 |

(Continued)

OTHER PUBLICATIONS

International Search Report mailed Nov. 6, 2012, in corresponding International Patent Application No. PCT/JP2012/069010.

(Continued)

*Primary Examiner* — David Payne
*Assistant Examiner* — Omar S Ismail
(74) *Attorney, Agent, or Firm* — Staas & Halsey LLP

(57) ABSTRACT

An optical modulator includes: a substrate that having an optical waveguide that includes a split section that splits light into two light waves, a pair of arms through which the light waves propagate, and a combining section that combines the light waves from the pair of arms with each other; and an electrode that overlaps part of the optical waveguide and generates an electric field by a voltage applied to the electrode. The optical waveguide has a narrow portion that is narrower than another portion of the optical waveguide and is arranged so that the electrode does not overlap with the narrow portion.

19 Claims, 12 Drawing Sheets

(56) References Cited

U.S. PATENT DOCUMENTS

| | | |
|---|---|---|
| 2011/0305412 A1 | 12/2011 | Sugiyama |
| 2012/0027337 A1 | 2/2012 | Kondou et al. |
| 2013/0195400 A1 | 8/2013 | Miyazaki et al. |

FOREIGN PATENT DOCUMENTS

| | | |
|---|---|---|
| JP | 7-281041 | 10/1995 |
| JP | 10-73791 | 3/1998 |
| JP | 2009-80189 | 4/2009 |
| JP | 2010-237376 | 10/2010 |
| JP | 2011-118055 | 6/2011 |
| JP | 2011-257634 | 12/2011 |
| JP | 2012-78508 | 4/2012 |

OTHER PUBLICATIONS

Written Opinion of the International Search Authority mailed Nov. 6, 2012, in corresponding International Patent Application No. PCT/JP2012/069010.

\* cited by examiner

OPTICAL MODULATOR AND OPTICAL TRANSMITTER

CROSS-REFERENCE TO RELATED APPLICATION(S)

This application is a continuation application of International Application PCT/JP2012/069010 filed on Jul. 26, 2012 and designated the U.S., the entire contents of which are incorporated herein by reference.

FIELD

A certain aspect of the embodiments is related to an optical modulator and an optical transmitter.

BACKGROUND

There is known an optical waveguide using an electro-optic crystal such as a $LiNbO_3$ (LN) substrate, a $LiTaO_2$ (substrate) or the like. The optical waveguide is formed by, for example, forming a metal film such as titanium on part of a surface of the substrate and thermally diffusing the same into the substrate. Alternatively, the optical waveguide is formed by patterning the metal film on the substrate and then performing proton exchange in benzoic acid. Also, an optical waveguide device is provided with an electrode for use in control in the vicinity of the optical waveguide. As such an optical waveguide device, there may be mentioned a Mach-Zehnder optical modulator (hereinafter, referred to as "MZ"), for example.

The MZ optical modulator is used in optical devices such as an optical transmitter and the like, and modulates the intensity of light input from an external light source to generate an optical signal. The optical waveguide of the MZ optical modulator has a split section that splits incident light from the light source, a pair of arms through which light waves propagate, and a combining section that recombines the light waves propagating through the arms.

The MZ optical modulator performs modulation by generating an electric field by applying a voltage to an electrode provided above the waveguide and controlling the refractive index of light in the waveguide by utilizing the Pockels effect. By this control, the MZ optical modulator is in an on-state in which the light waves strengthen each other and are then output when the light waves combined in the combining section are in phase, and is in off-state in which the light waves cancel each other and no light is output when the two light waves are in opposite phase (in a state having a phase difference of $\pi$).

The ratio of the intensity of output light between the on-state and the off-state is called optical quenching ratio and is known as one of the parameters relating to the communications quality. Although the optical quenching ratio is infinite under the ideal conditions, the optical quenching ratio is actually finite due to the ratio of the powers of light propagating through the pair of arms and the influence of light in a higher-order mode.

As to the MZ optical modulator, there is known an art that uses a voltage adjustment to make the powers of the light waves propagating through the arms equal to each other (see Japanese Laid-Open Patent Application No. 2009-80189, for example). There is known another art that provides a stage that follows the combining section with an output waveguide for a higher-order mode to prevent mode-mismatch light from being mixed in the output light (see Japanese Laid-Open Patent Application No. 2010-237376, for example). There is known yet another art that provides the split section with a portion having a lower refractive index than that of another portion to set the ratio of power splitting in the split section equal to 50% (Japanese Laid-Open Patent Application No. 2011-257634, for example).

There is known a further art that provides a part of the arms with a portion that gradually narrows and becomes gradually wide to absorb stress generated in the waveguide at the time of production of the waveguide and cancel birefringence (Japanese Laid-Open Patent Application No. 7-281041, for example). There is a still further art that provides one of the pair of arms with a portion that is narrower than another portion and provides the other arm with a portion that is wider than another portion to compensate for error in the width of the waveguide and error in the angle thereof that are induced during the manufacturing process (Japanese Laid-Open Patent Application No. 2011-118055, for example).

SUMMARY

According to an aspect of the present invention, there is provided an optical modulator including: a substrate that having an optical waveguide that includes a split section that splits light into two light waves, a pair of arms through which the light waves propagate, and a combining section that combines the light waves from the pair of arms with each other; and an electrode that overlaps part of the optical waveguide and generates an electric field by a voltage applied to the electrode, the optical waveguide having a narrow portion that is narrower than another portion of the optical waveguide and is arranged so that the electrode does not overlap with the narrow portion.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

With the recent spread of high-speed optical communications networks, multi-level modulations such as DQPSK (Differential Quadrature Phase Shift Keying) are frequently used instead of the binary modulation.

For example, in arms that are multimode waveguides, light split in the split section includes light in a higher-order mode although the powers of light propagating through the arms are equal to each other. Light of the higher-order mode has a different degree of modulation by the electric field generated from the electrode from the degree of modulation of light in the primary mode. Thus, the phase difference between the light waves propagating through the two arms is not equal to $\pi$ in the off-state but is output as noise light, which deteriorates the light quenching ratio. The art disclosed in Japanese Laid-Open Patent Application No. 2011-257634 may be capable of removing light in the higher-order mode generated in the combining section. However, this art is not feasible for removing light in the higher-order mode that propagates through the arms and is combined with light in the primary mode in the combining section.

According to an aspect of the present invention, there is provided an optical modulator and an optical transmitter having an effectively improved quenching ratio.

Figure 1:
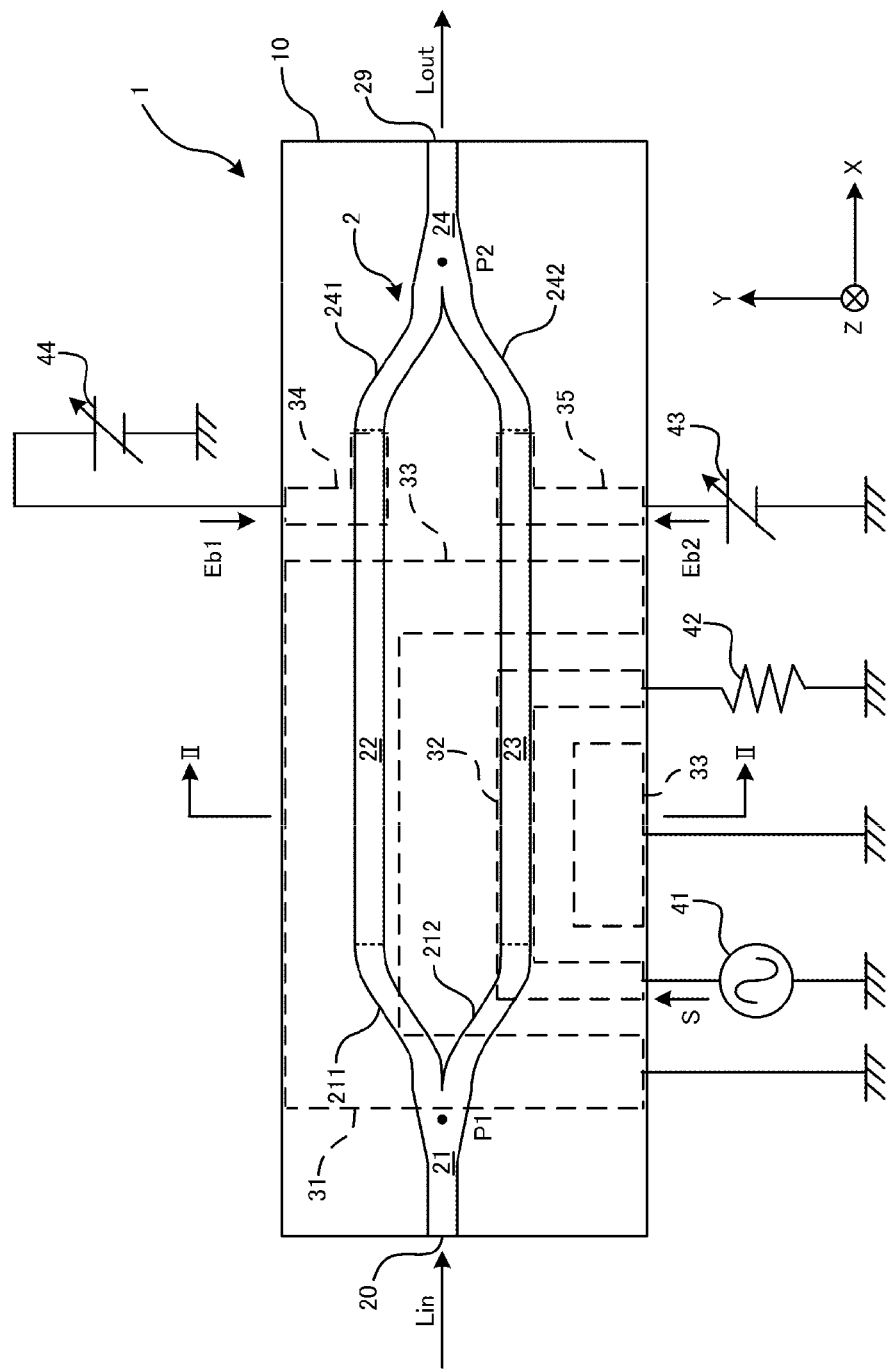
FIG. 1 is a plan view of an optical modulator in accordance with a comparative example.

First, a description is given of a comparative example. FIG. 1 is a plan view of an optical modulator in accordance with a comparative example. An optical modulator 1 includes a substrate 10 in which an optical waveguide is formed, ground electrodes 31 and 33, a signal electrode 32, bias electrodes 34 and 35, a signal source 41, a termination resistor 42, and DC power sources 43 and 44. Since the electrodes 31 through 35 are formed on a surface of the substrate 10, these electrodes are illustrated by dotted lines in FIG. 1 in order to discriminate the electrodes from the shape of an optical waveguide 2.

The optical modulator 1 modulates light Lin input from an inlet 20 of the optical waveguide 2, and outputs modulated light from an outlet 29 as output light Lout. The output light Lout has an on-state and an off-state, and the power ratio of light between the on-state and the off-state is calculated as the optical quenching ratio.

The substrate 10 is an electro-optic crystal such as an LN substrate, an $LiTaO_2$ substrate and the like, and a plate surface of a rectangular shape. The optical waveguide 2 of MZ type is formed in the substrate 10. The optical waveguide 2 includes a split section 21 that splits the power of input light into two, a pair of arms 22 and 23 through which light waves by power splitting propagate, and a combining section 24 that combines the light waves output from the pair of arms 22 and 23 with each other. In FIG. 1, the boundaries between the sections 21 through 24 are illustrated by dotted lines that extend over the optical waveguide 2 in a Y-axis direction. In the following description, dimensions in an X-axis direction are defined as length, dimensions in the Y-axis direction are defined as width, and dimensions in a Z-axis direction are defined as thickness.

The pair of arms 22 and 23 are linear waveguides that extend in parallel. The split section 21 has a Y-shaped portion, and includes a pair of input waveguides 211 and 212 that extend from a split point P1 at which the power light is split into two up to the pair of arms 22 and 23. The pair of input waveguides 211 and 212 and a pair of output waveguides 241 and 242 are curved waveguides having S-shaped curves, for example.

Since the optical waveguide 2 is a multimode waveguide, light split into two powers in the split section 21 includes not only light in the primary mode but also light in a higher-order mode. The propagation mode of light is determined in accordance with the incident angle of light totally reflected by the boundary between the optical waveguide 2 that is a core, and an external portion that is a clad.

Figure 2:
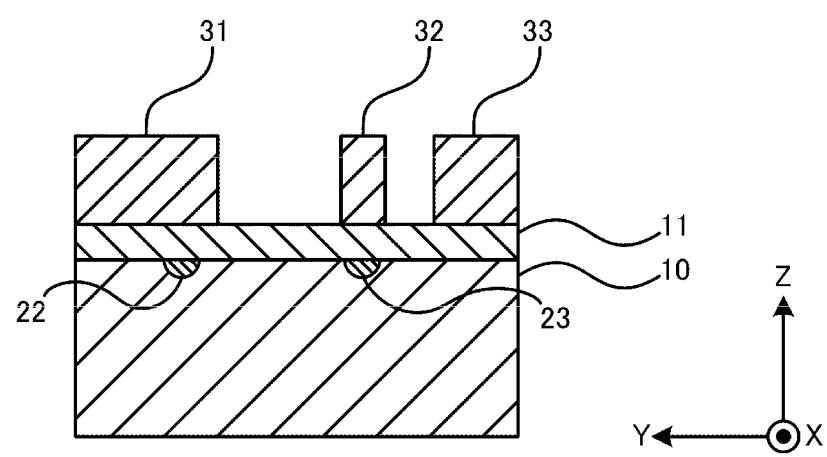
FIG. 2 is a cross-sectional view taken along a line II-II in FIG. 1.

FIG. 2 is a cross-sectional view taken along a line II-II in FIG. 1. The optical waveguide 2 (here, arms 22 and 23) has a cross section having a semicircular shape, and is formed by, for example, forming a metal film such as titanium on parts of the surface of the substrate 10 and thermally diffusing the metal into the substrate 10. The optical waveguide 2 is not limited to the above but may be formed by patterning the metal film on the substrate 10 into a predetermined shape and performing proton exchange in benzoic acid.

On the substrate 10, stacked are a buffer layer 11 and the electrodes 31 through 33 in this order. The buffer layer 11 is formed by $SiO_2$ and is 0.2 to 2.0 μm thick, for example. The buffer layer 11 prevents the light propagating through the arms 22 and 23 from being absorbed in the signal electrode 32 and the ground electrodes 31 and 33.

The electrodes 31 to 35 formed by a conductor such as gold are provided on the buffer layer 11. When the substrate 10 is a Z-cut substrate along the Z direction of the optical axis of crystal, the electric field in the Z direction is used, and the signal electrode 32 and the bias electrodes 34 and 35 are provided just above the optical waveguide 2.

The signal electrode 32 and the bias electrodes 34 and 35 overlap with part of the optical waveguide 2 on the substrate 10, and generate electric fields in the optical waveguide 2 in response to respective voltages applied thereto. The electric fields generate the Pockels effects that are the first-order electro-optic effect in light propagating through the optical waveguide 2, whereby the refractive index is changed and the light is phase-modulated.

As illustrated in FIG. 1, the signal electrode 32 is formed to extend along the arm 23, and overlaps with a portion of the arm 23 that continuously extends from the split section 21. Two end portions of signal electrode 32 are curved so as to extend toward a side of the substrate 10.

The bias electrodes 34 and 35 are respectively formed to extend along the pair of arms 22 and 23, and overlap with portions of the arms 22 and 23 that extend from the combining section 24. One of the two end portions of the bias electrode 34 and one of the two end portions of the bias electrode 35 are curved toward the respective sides of the substrate 10.

The ground electrodes 31 and 33 are set at the ground potential. The ground electrode 31 is formed so as to extend along one of the opposite sides of the substrate 10, and has a portion that overlaps with part of the arm 22 continuously extending from the split section 21. Both end portions of the ground electrode 31 are curved toward the other side of the substrate 10. The ground electrode 33 has a rectangular shape and extends along the side of the substrate 10 opposite to the side thereof along which the ground electrode 31 extends. That is, the ground electrodes 31 and 33 are provided so that the signal electrode 32 is interposed therebetween on the substrate 10. The electrodes 31 to 35 have an electrode structure of a coplanar line type.

The signal electrode 32 is a traveling wave electrode, and a modulation signal S for modulating light is input from the signal source 41. The modulation signal S is an electric RF signal (microwave), and is input to a portion of the signal electrode 32 close to the input end of the arm 23. Then, the modulation signal S propagates along the propagation direction of light, and is then output to the termination resistor 42 from another portion of the signal electrode 32 close to the output end of the arm 23. One end of the termination resistor 42 is connected to the arm 23, and the other is grounded. The resistance value of the termination resistor 42 is determined in accordance with the electrical characteristics of the signal source 41 and the signal electrode 32.

Therefore, the refractive indexes of the pair of arms 22 and 23 are changed, for example, to +ΔNa, and −ΔNb, respectively, so that the light waves propagating through the arms 22 and 23 have a phase difference. The combing of the light waves propagating through the arms 22 and 23 in the combining section 24 results in Mach-Zehnder interference, and the above phase difference determines the on-state or off-state of the output light Lout. The optical modulator 1 has an operation band as wide as 10 GHz or more, for example, since the modulation signal S is speed-matched with the light wave propagating through the arm 23 by an adjustment of the effective refractive index of the arm by controlling the shape of the cross section of the signal electrode 32.

The bias electrodes 34 and 35 are connected to the DC power sources 44 and 43, respectively. The DC power sources 44 and 43 apply bias voltages Eb1 and Eb2 to the bias electrodes 34 and 35, respectively, in order to compensate for a deviation of the operating point of the modulation signal S on the characteristic caused by a temperature change. The bias voltages Eb1 and Eb2 may be determined in accordance with the level of the output light Lout obtained by a photodiode, for example. Although the bias electrodes 34 and 35 are provided separately from the signal electrode 32 in the present embodiment, a bias T circuit may be used to use the bias electrodes 34 and 35 common to the signal electrode 32.

The bias electrodes 34 and 35 are separately provided for independently controlling the pair of arms 22 and 23. The bias electrode 35, which is one of the bias electrodes 34 and 35, is provided above the arm 23 so as to be spaced apart from a portion of the signal electrode 32 on the termination side by a certain distance.

Figure 3:
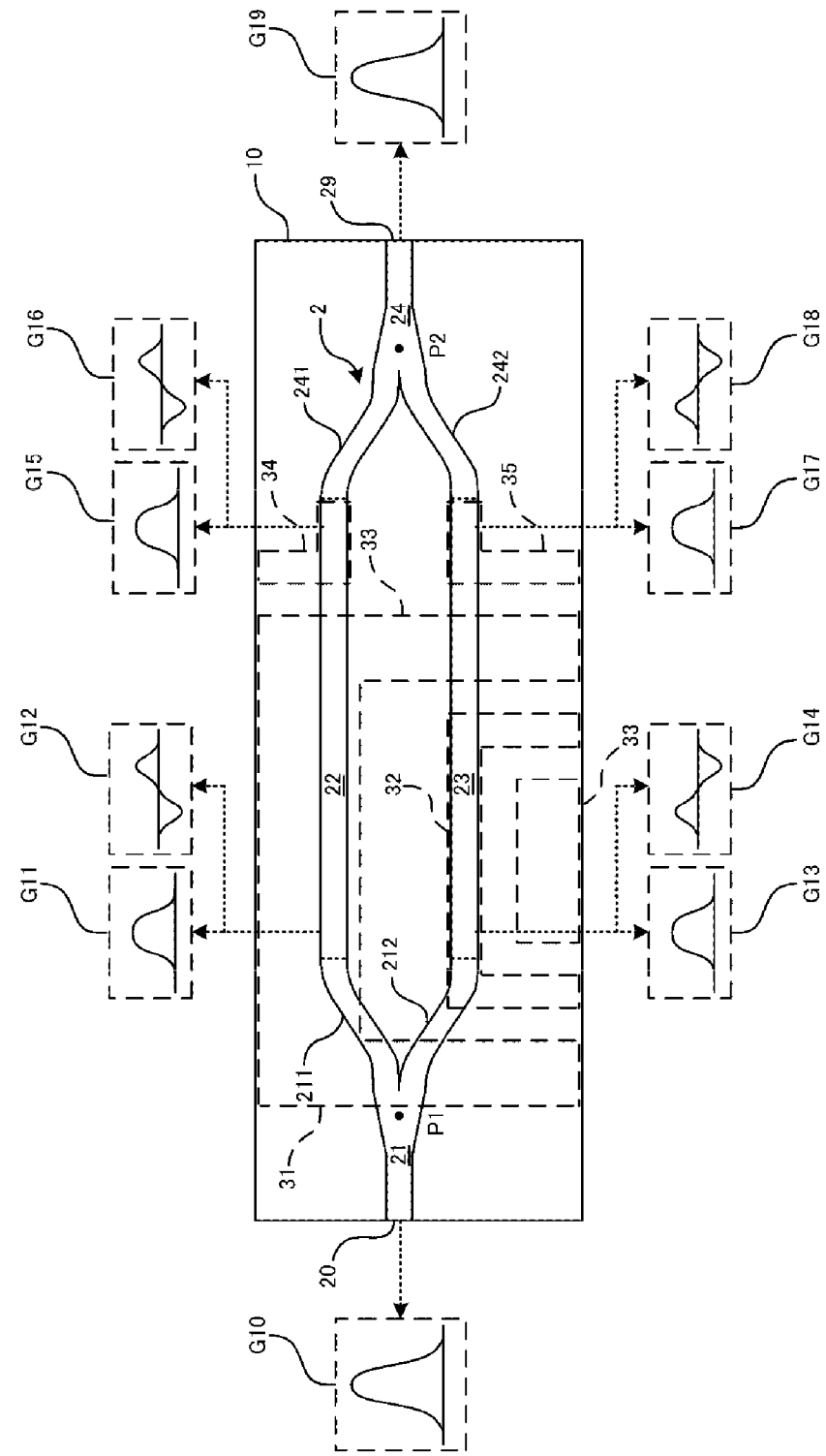
FIG. 3 is a diagram that illustrates light spectra measured in portions of an optical waveguide that is in an on-state.

A description is now given of light propagating through the optical waveguide 2 of the optical modulator 1. In FIG. 3, there are illustrated spectra of light at portions of the optical waveguide 2 that is in the on-state.

A graph G10 is a spectrum of light input to the split section 21. The power of the incident light is split into the two arms 22 and 23, and the resultant light waves propagate through the pair of arms 22 and 23 as indicated by graphs G11 through G14.

Through the arm 22, light in the primary mode (0-order mode) indicated by graph G11 and light in a higher-order mode indicated by graph G12 propagate. Through the other arm 23, light in the primary mode indicated by graph G13 and light in a higher-order mode indicated by graph G14 propagate. Lights of higher-order modes are generated because the optical waveguide 2 is the multimode waveguide as described previously.

In the on-state, the signal electrode 32 is provided with a voltage of the modulation signal S that makes the phase difference in light between the arms 22 and 23 equal to zero. Thus, the light waves propagating through the arms 22 and 23 are input to the combining section 24 in phase. The spectra of light in the primary mode are indicated by graphs G15 and 16, and spectra of light in higher-order modes are indicated by graphs G17 and G18.

The light waves combined in the combining section 24 are in phase and are combined to strengthen power to be output as light in the primary mode indicated by graph G19. At this time, the light waves of the higher-order modes that propagate through the arms 22 and 23 (light waves of G16 and G18) are changed to light in the primary mode due to interference, which is combined into the output light.

Figure 4:
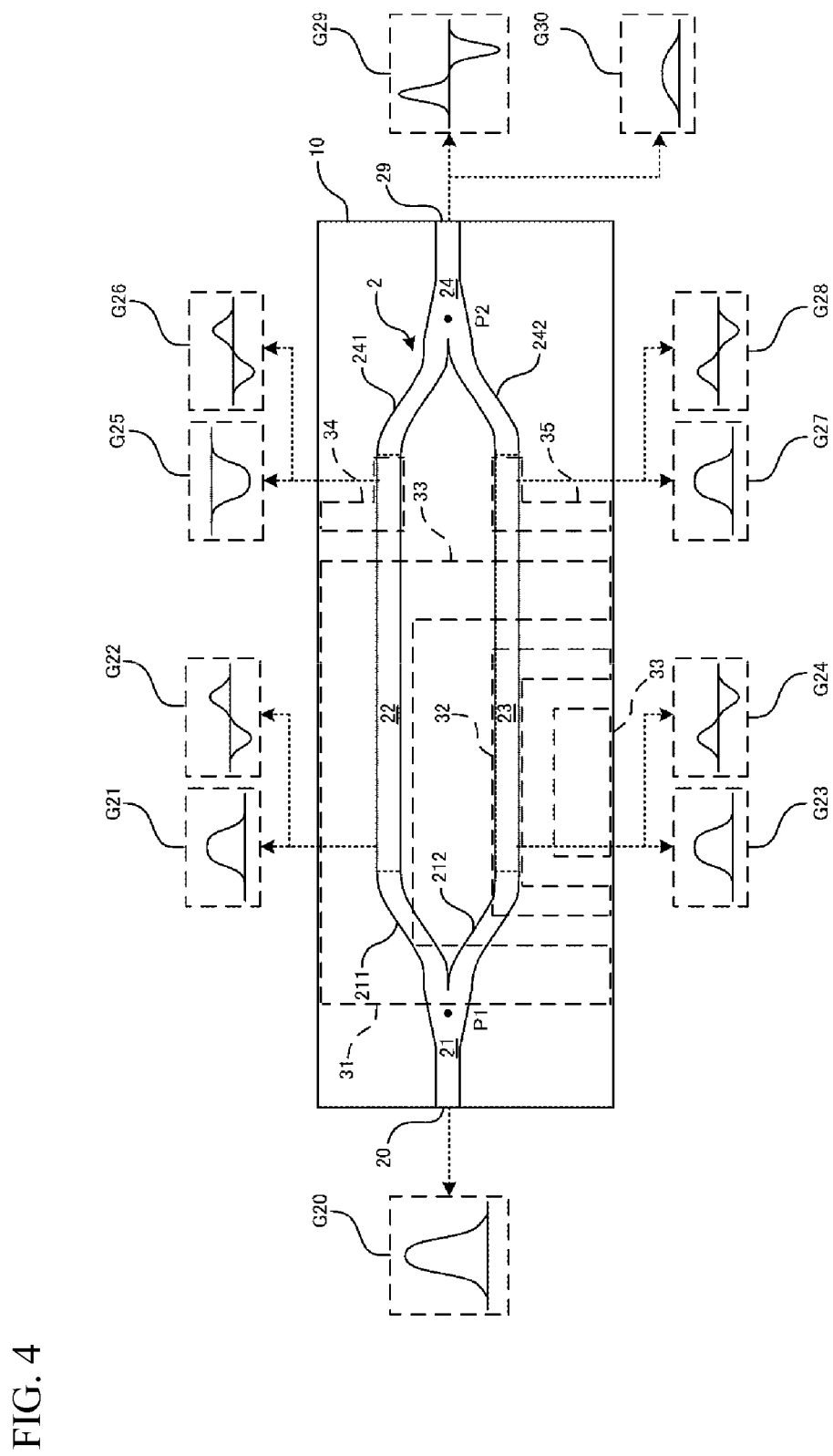
FIG. 4 is a diagram that illustrates light spectra measured in portions of an optical waveguide that is in an off-state.

FIG. 4 illustrates spectra of light at portions of the optical waveguide 2 that is in the off-state. Graph G20 indicates a spectrum of light input to the split section 21. Graphs G21 and G23 indicate spectra of light in the primary mode split by the split section 21, and graphs G22 and G24 indicate spectra of light in higher-order modes.

In the off-state, the signal electrode 32 is provided with a voltage of the modulation signal S that causes the light waves propagating through the arms 22 and 23 to have a phase difference of π. Thus, the light waves propagating through the arms 22 and 23 are input to the combining section 24 in opposite phase. Thus, the combined light is light in a higher-order mode illustrated by graph G29 and is emitted to the outside. That is, the light waves of the higher-order modes indicated by graphs G25 and G27 are canceled in the combining section 24.

The light in the higher-order mode has a different confinement in the optical waveguide 2 from that of light in the primary mode, and has a different degree of modulation by the electric field (that is, the efficiency of application of the electric field). That is, the voltage of the modulation signal S that makes the phase difference of π between the light waves of the higher-order modes indicated by graphs G26 and G28 is different from that for the light waves of the primary mode indicated by graphs G25 and G27.

Thus, the light waves of the higher-order modes indicated by graphs G26 and G28 are not canceled but remain, and is output to the outside from the outlet 29 as noise light in the primary mode indicated by graph G30. The noise light is a factor of deterioration of the optical quenching ratio. According to an aspect of an embodiment described below, the optical waveguide 2 has a narrow portion that is narrower than the portion in order to remove light in a higher-order mode.

First Embodiment

Figure 5:
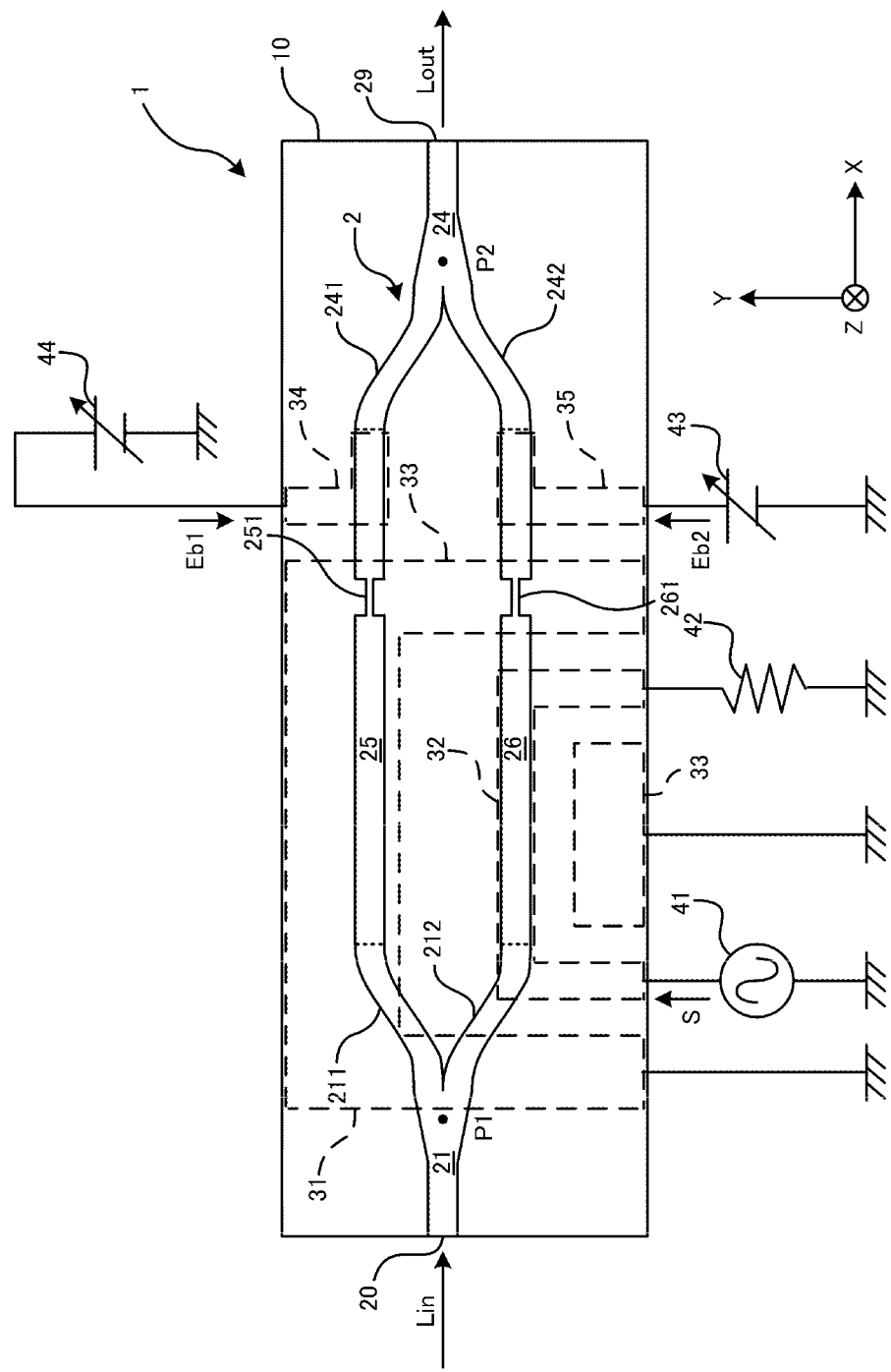
FIG. 5 is a plan view of an optical modulator in accordance with a first embodiment.

FIG. 5 is a plan view of an optical modulator 1 in accordance with a first embodiment. In FIG. 5, similar reference numerals are given to structural parts of the comparative example having similar functions in FIG. 1, and a description thereof is omitted.

In the first embodiment, a pair of arms 25 and 26 are respectively provided with narrow portions 251 and 261 that are smaller in width than the other portions. The narrow portion 261 of the arm 26 is provided between the portion with which the signal electrode 32 overlaps and the portion with which the bias electrode 35 overlaps. The narrow portion 251 of the arm 25 paired with the arm 26 is located in the same position as that of the narrow portion 261 in the length direction.

The narrow portions 251 and 261 function to weaken the confinement of light in the arms 25 and 26. This is because the narrowed portions of the arms 25 and 26 have a lower concentration of impurities diffused into the arms 25 and 26, and therefore, have a lower saturation refractive index. Thus, the narrow portions 251 and 261 allow only light in the primary mode to pass and emit light in higher-order modes to the outside. That is, the narrow portions 251 and 261 function as single-mode waveguides that filter multimode light.

The removal of the multimode light by the narrow portions 251 and 261 may be confirmed by propagating light through the optical waveguide 2. For example, an optical fiber is coupled with the inlet 20 of the optical waveguide 2 and light from the light source is applied, while a camera for measuring the output light Lout is attached to the outlet 29 of the optical waveguide 2. When the optical fiber coupled with the inlet 20 is moved, if images of the output light obtained by the camera do not have any change, it is confirmed that light in the multimode has been removed by the narrow portions 251 and 261.

The narrow portions 251 and 261 are provided so as to avoid the portions of the arms 25 and 26 with which the signal electrode 32 overlaps and the portions thereof with which the bias electrode 35 overlaps. Thus, it is possible to avoid deterioration of the confinement of light in the portions of the optical waveguide 2 having comparatively strong electric fields (in which lines of electric force concentrate). If the narrow portions 251 and 261 are provided in the portions of the arms 25 and 26 with which the signal electrode 32 overlap and those with which the bias electrode 35 overlaps, the confinement of light deteriorates and the modulation efficiency by the modulation signal S deteriorates.

The above tendency is conspicuous in a situation in which the confinement of light is comparatively weak such as the LN modulator of the present embodiment. A deterioration of the modulation efficiency is needed to increase the drive voltage of the signal source 41 and leads to an increase in power consumption and the amount of heat generation. If the signal electrode 32 and the bias electrode 35 are lengthened or the arms 25 and 26 are lengthened in order to compensate for deterioration of the modulation efficiency, the optical modulator 1 has a larger size.

As described above, the narrow portions 251 and 261 are provided in portions of the optical waveguide 2 having comparatively weak electric fields, whereby light in higher-order modes are removed from the optical waveguide 2 without increasing the drive voltage and size of the optical modulator 1. In the examples illustrated in FIGS. 3 and 4, light waves in the higher-order modes indicated by graphs G12, G14, G22 and G24 are removed by the narrow portions 251 and 261. Thus, the noise light indicated by graph G30 is not generated and the optical quenching ratio of the optical modulator 1 is improved. According to a computer simulation conducted by the inventors, the optical quenching ratio of the comparative example is −24.6 dB, while the optical quenching ratio of the present embodiment is −35.2 dB. In the present embodiment, the pair of arms 25 and 26 are provided with the narrow portions 251 and 261, respectively. When only one of the arms 25 and 26 is provided with the narrow portion, noise is reduced and similar functions and effects are obtained.

Second Embodiment

Figure 6:
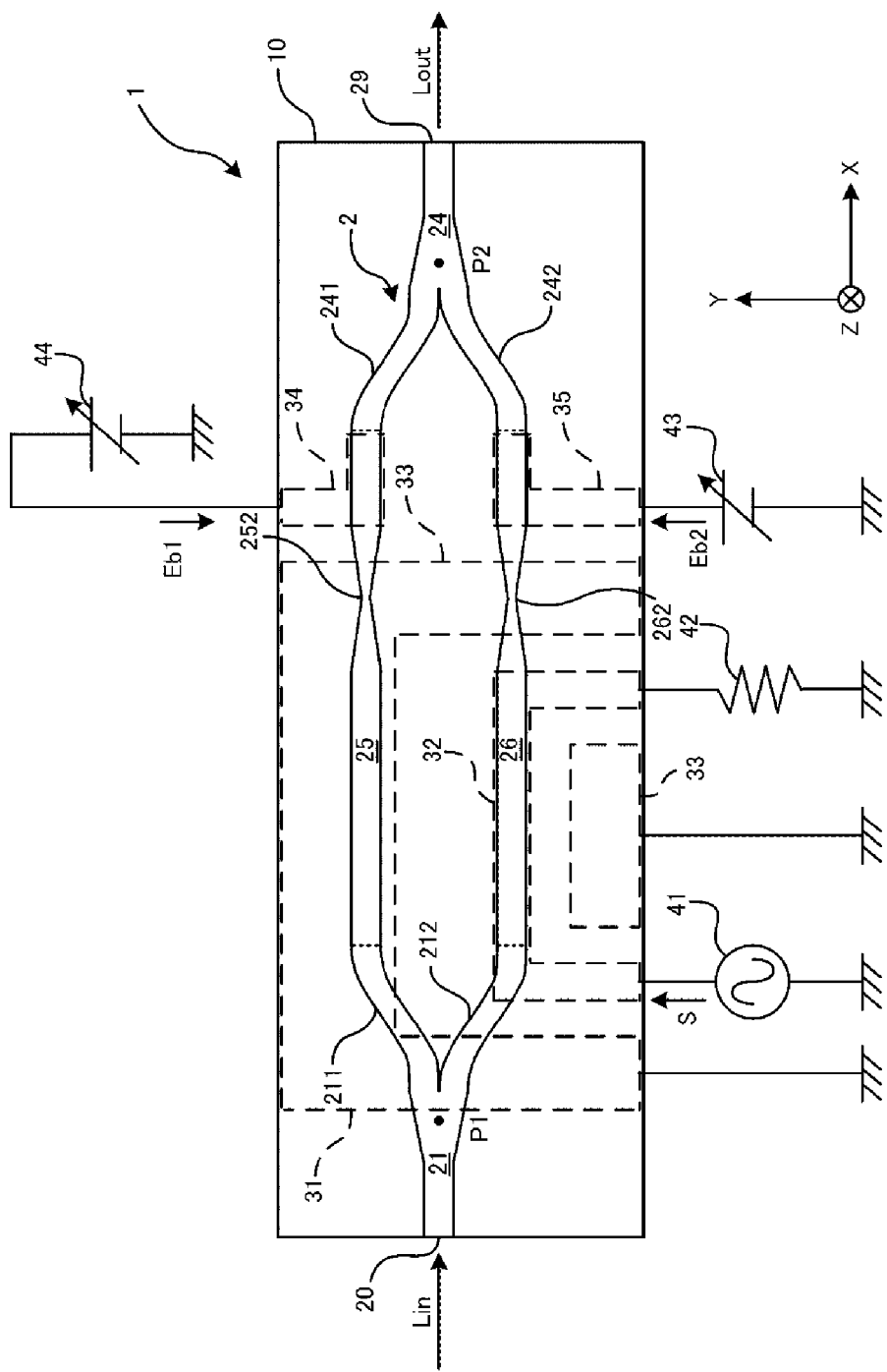
FIG. 6 is a plan view of an optical modulator in accordance with a second embodiment.

The first embodiment has a possibility that a certain distance between the signal electrode 32 and the bias electrode 35 leads to a steep change in the widths of the narrow portions 251 and 261 and causes loss due to light diffusion. With the above into consideration, the optical waveguide 2 of the optical modulator 1 illustrated in FIG. 6 has portions that gradually narrows toward narrow portions 252 and 262. In FIG. 6, similar reference numerals are given to structural parts of the comparative example having similar functions in FIG. 1, and a description thereof is omitted.

In the second embodiment, the narrow portions 252 and 262 are respectively provided in the pair of arms 25 and 26. The optical waveguide 2 has tapered portions that are narrower toward the narrow portions 252 and 262.

In the arm 26, the starting position of the tapering is selected so as to avoid the portion with which the signal electrode 32 overlaps and the portion with which the bias electrode 35 overlaps in order to avoid the aforementioned deterioration of the modulation efficiency. In the arm 25, the starting position of the tapering is selected so as to avoid the portion having a strong electric field of the ground electrode 31 and the portion with which the bias electrode 34 overlaps.

By gradually reducing the widths of the arms 25 and 26 of the optical waveguide 2 toward the narrow portion 252 and 262, the optical quenching ratio is improved while loss due to light diffusion is suppressed. In the second embodiment, the tapered portions that gradually narrows toward the narrow portions 252 and 262 contribute removal of light waves in the higher-order modes in addition to the narrow portions 252 and 262, and the optical quenching ratio is further improved. The second embodiment is not limited to the tapered portions but may have, for example, stepwise portions that are stepwise narrowed toward the narrow portions 252 and 262.

Figure 7:
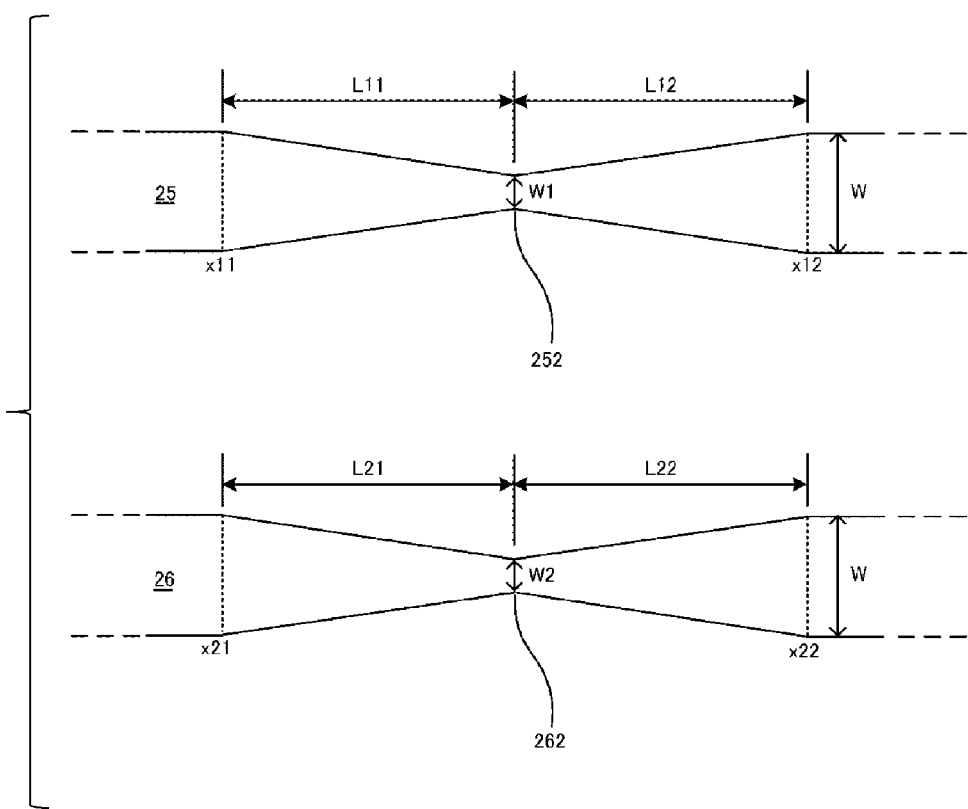
FIG. 7 is an enlarged plan view of a narrow portion.

When the dimensions of the narrow portions 252 and 262 are equal to each other, losses caused in the narrow portions 252 and 262 are further reduced. For example, in an enlarged view of the narrow portions 252 and 262 in FIG. 7, the narrow portions 252 and 262 have the widths W1 and W2 equal to each other. The tapered portions connecting to the narrow portions 252 and 262 have lengths L11, L12, L21 and L22 that are equal to each other. The lengths L11 and L12 of the tapered portions are measured from positions x11 and x12 where the width starts to change to the narrow portion 252. The lengths L21 and L22 of the tapered portions are measured from positions x21 and x22 where the width starts to change to the narrow portion 262.

Third Embodiment

Figure 8:
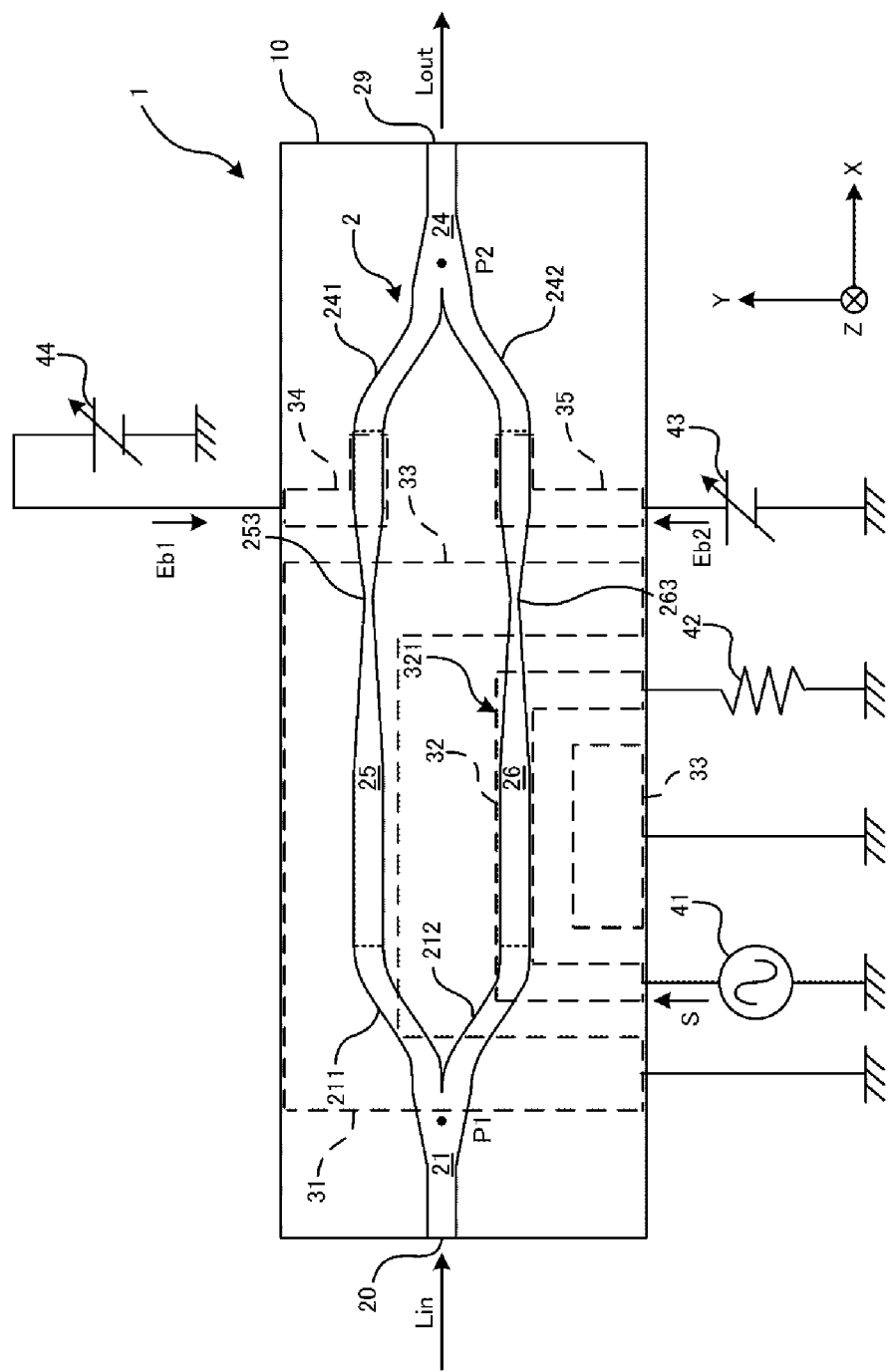
FIG. 8 is a plan view of an optical modulator in accordance with a third embodiment.

In the second embodiment, the tapered portions that connect to the narrow portion 262 are provided so as to avoid the arm portion with which the signal electrode 32 overlaps and the arm portion with which the bias electrode 35 overlaps. However, the second embodiment is not limited to the above arrangement. FIG. 8 illustrates another structure of the optical modulator 1 in which tapered portions start from the arm portion with which the signal electrode 32 overlaps and the arm portion with which the bias electrode 35 overlaps toward a narrow portion 263. In FIG. 8, similar reference numerals are given to structural parts of the comparative example having similar functions in FIG. 1, and a description thereof is omitted.

In the example illustrated in FIG. 8, as to a narrow portion 253 paired with the narrow portion 263, the optical waveguide 2 has a tapered portion that starts from the arm portion with which the bias electrode 34 overlaps and gradually narrows toward the narrow portion 253. That is, the tapered portions that connect to the narrow portions 253 and 263 start from the portion with which the signal electrode 32 overlaps, the portion with which the bias electrode 35 overlap, and the portion with which the bias electrode 34 overlaps.

The above structure makes the tapered portions longer, and the optical quenching ratio of the compact optical modulator 1 is thus improved. The third embodiment may be varied so that only one of the two tapered portions that connect the narrow portion 263 starts to taper from a the portion of the arm 26 with which the signal electrode 32 or the bias electrode 35 overlaps.

The above structure may affect the modulation efficiency because the width of the optical waveguide 2 starts to taper from the portion with which the signal electrode 32 overlaps, the portion with which the bias electrode 34 overlaps, and the portion with which the bias electrode 35 overlaps. Particularly, a change of the width of the portion with which the signal electrode 32 overlaps changes the efficiency of modulation of light and may affect not only the drive voltage but also the modulation band. The modulation band is determined on the basis of the value obtained by integrating the modulation efficiency over the arm 26.

The modulation efficiency depends on the frequency of the modulation signal s, and changes due to the position in the optical waveguide 2. As the frequency is higher, the microwave has a larger loss. Thus, the modulation efficiency in the output portion of the arm 26 from which the modulation signal S is output is lower than that in the input portion thereof to which the modulation signal S is applied.

In the present embodiment, the width of the optical waveguide 2 gradually decreases from a portion of the arm 26 with which a portion 321 of the signal electrode 32 on the termination side for the modulation signal S overlaps toward the narrow portion 263. The portion 321 of the signal electrode 32 on the termination side for the modulation signal S is close to the end to which the termination resistor 42 is connected.

According to the above structure, the optical waveguide 2 is narrowed in the output portion of the arm 26 having a low modulation efficiency, namely, the portion of the arm 26 with which the portion 321 of the signal electrode 32 on the termination side for the modulation signal S overlaps.

Fourth Embodiment

Figure 9:
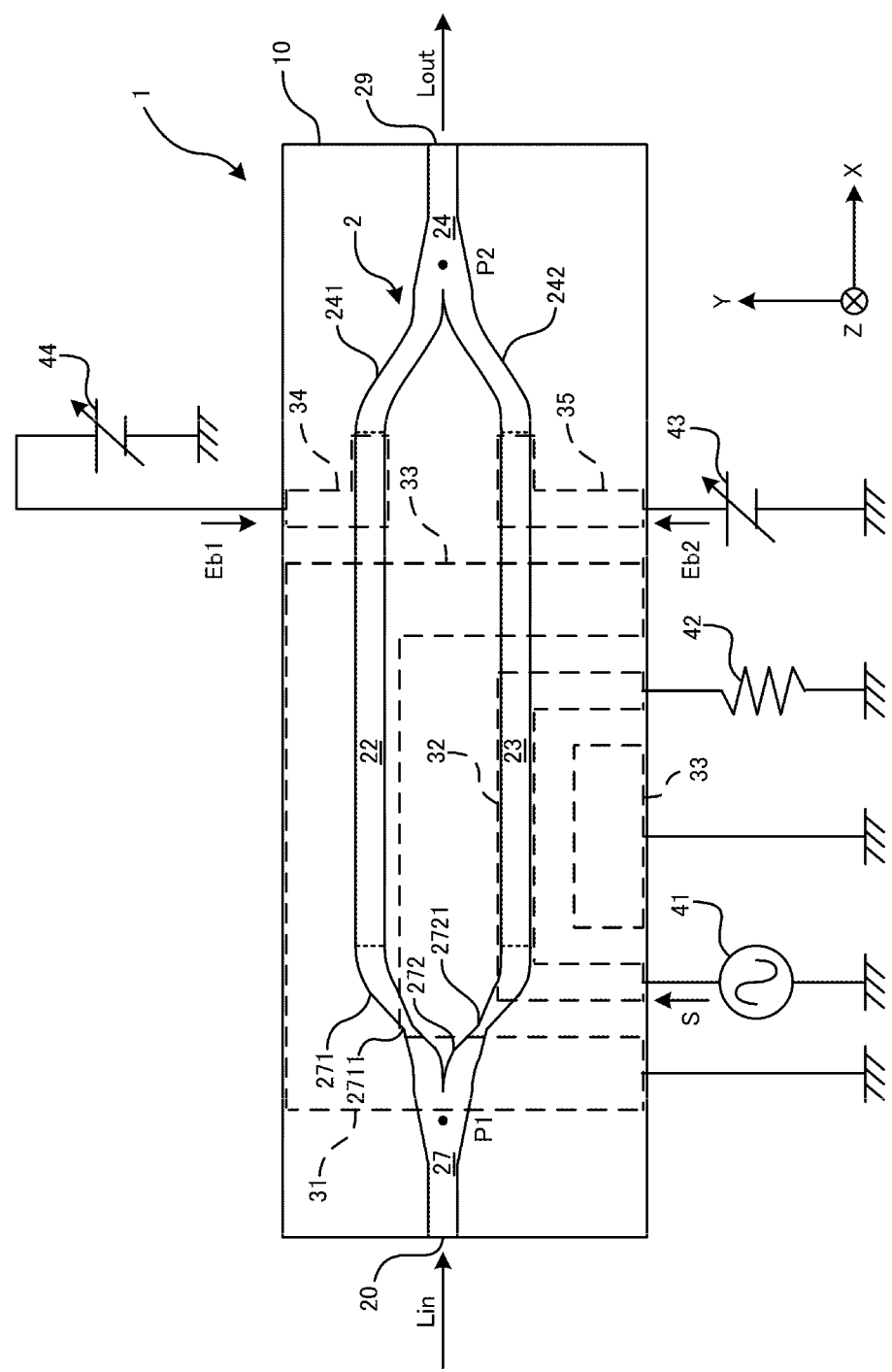
FIG. 9 is a plan view of an optical modulator in accordance with a fourth embodiment.

According to the first through third embodiments, the narrow portions 251 to 253 are provided in the arm 25, and the narrow portions 261 to 263 are provided in the arm 26. However, the present invention is not limited to the above arrangement. FIG. 9 illustrates a structure of the optical modulator 1 in which narrow portions 2711 and 2721 are provided in a pair of input waveguides 271 and 272 of the split section 27, respectively. In FIG. 9, similar reference numerals are given to structural parts of the comparative example having similar functions in FIG. 1, and a description thereof is omitted.

In the present embodiment, the widths of the pair of input waveguides 271 and 272 gradually decrease toward the narrow portions 2711 and 2721, respectively. The optical waveguide 2 has tapered portions that are narrower toward the narrow portions 2711 and 2721. The positions where the optical waveguide 2 start to taper may be located in portions of the input waveguides 271 and 272 with which the signal electrode 32 overlaps.

According to the present embodiment, the widths of the optical waveguide 2 that connect to the narrow portions 2711 and 2721 gradually decrease, and functions and effects similar to those of the second and third embodiments are thus obtained. Since the narrow portions 2711 and 2721 are not provided in the pair of arms 22 and 23, the arms 22 and 23 may be shortened. Thus, the present invention is capable of improving the optical quenching ratio of the compact optical modulator 1.

Fifth Embodiment

Figure 10:
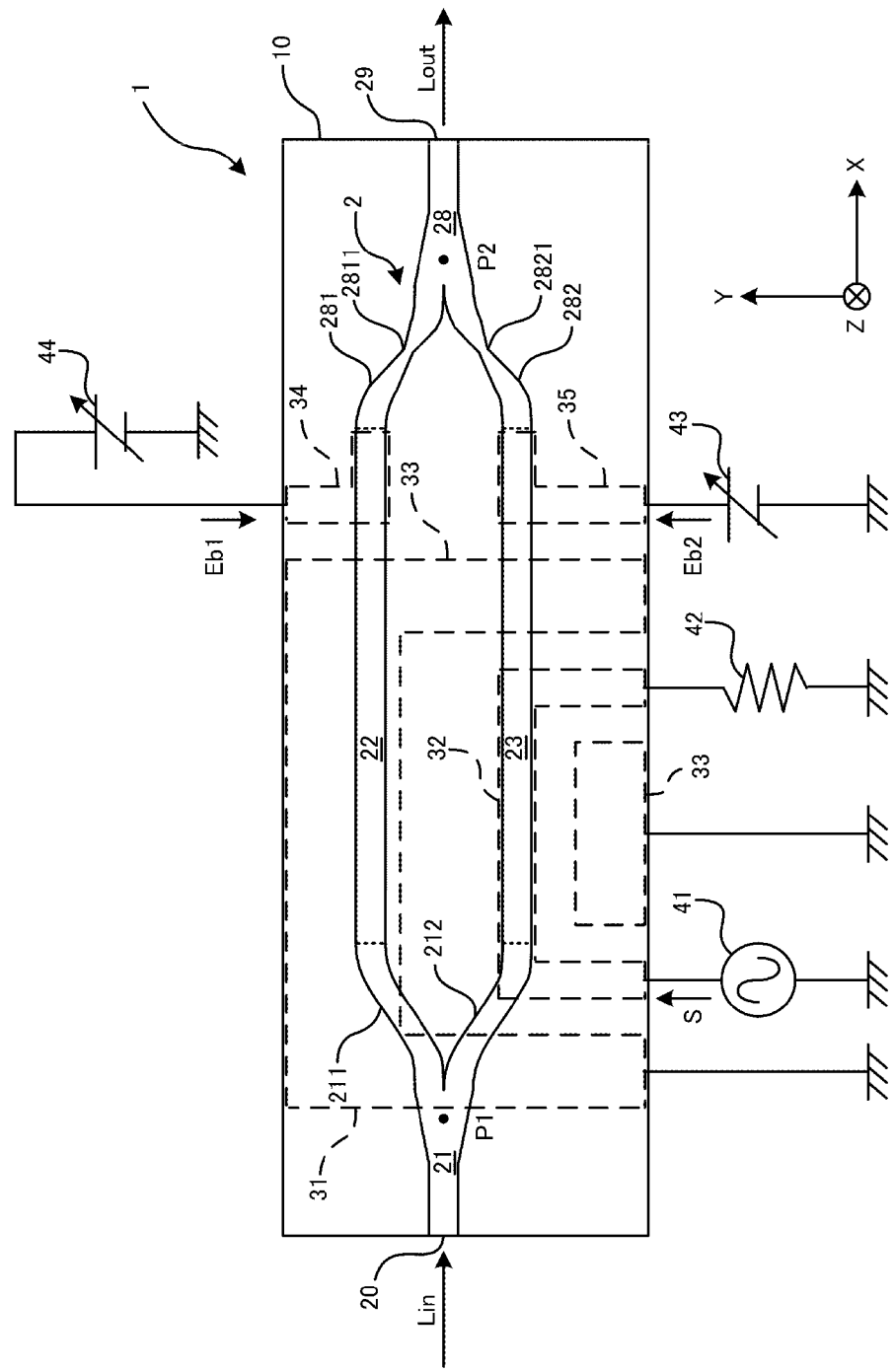
FIG. 10 is a plan view of an optical modulator in accordance with a fifth embodiment.

The narrow portions 2711 and 2721 of the fourth embodiment are not limited to the arrangement in the split section 27 but may be provided in the combining section 24. FIG. 10 illustrates a structure of the optical modulator 1 in which narrow portions 2811 and 2821 are provided in a pair of output waveguides 281 and 282, respectively. In FIG. 10, similar reference numerals are given to structural parts of the comparative example having similar functions in FIG. 1, and a description thereof is omitted.

The widths of the pair of output waveguides 281 and 282 gradually decrease toward the narrow portions 2811 and 2821. That is, the optical waveguide 2 has tapered portions that gradually narrows toward the narrow portions 2811 and 2821. The positions where the optical waveguide 2 start to taper may be located in portions of the output waveguides 281 and 282 with which the bias electrodes 34 and 35 overlap, respectively.

According to the present embodiment, the widths of the optical waveguide 2 that connect to the narrow portions 2811 and 2821 gradually decrease, and functions and effects similar to those of the second and third embodiments are thus obtained. Further, since the narrow portions 2811 and 2821 are not provided in the pair of arms 22 and 23, functions and effects similar to those of the fourth embodiment are obtained. In the aforementioned embodiments, the narrow portions are provided in only one of the split section 27, the pair of arms 25 and 26 and the combining section 28. However, the narrow portions may be provided in at least two of the split section 27, the pair of arms 25 and 26 and the combining section 28.

Sixth Embodiment

Figure 11:
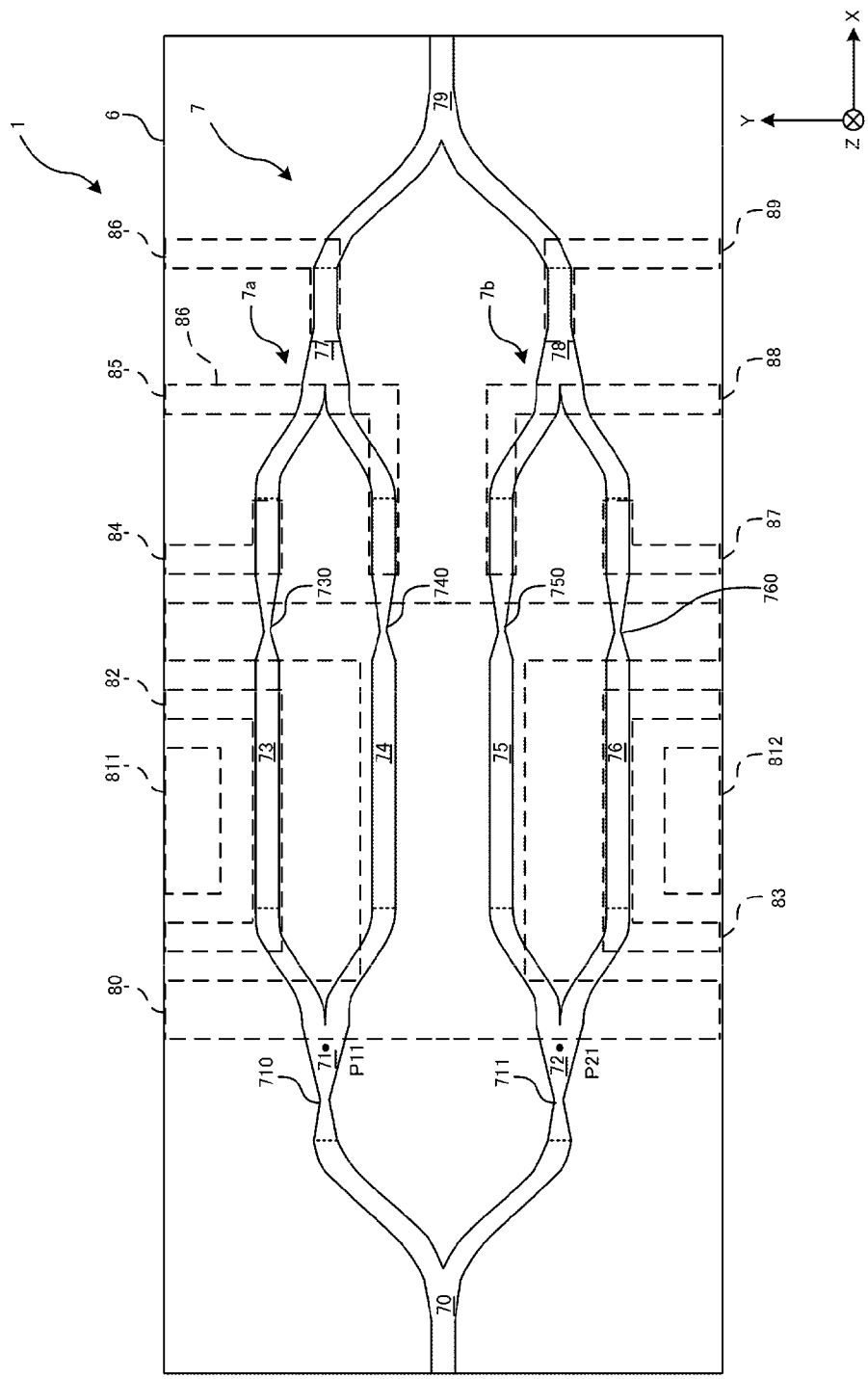
FIG. 11 is a plan view of an optical modulator in accordance with a sixth embodiment.

FIG. 11 illustrates a structure of the optical modulator 1 used for multilevel modulations such as DQPSK for high-speed optical communications. An optical waveguide 7 of the optical modulator 1 is a multimode waveguide formed in a substrate 6. The optical waveguide 7 includes a first split section 70, a pair of sub waveguides 7a and 7b, and a first combining section 79. In FIG. 11, boundaries between the sections 70 through 79 are depicted by dotted lines that extend over the optical wave guide 7 in its width direction.

The first split section 70 has a Y shape and splits the power of incident light into the pair of sub waveguides 7a and 7b. The pair of sub waveguides 7a and 7b are MZ waveguides similar to each other. The waveguide 7a includes a second split section 71, a pair of arms 73 and 74, and a second combining section 77. The waveguide 7b includes a second split section 72, a pair of arms 75 and 76, and a second combining section 78. Each of the sub waveguides 7a and 7b has a structure similar to that of the optical waveguide 2 of the embodiments.

The second split section 71 has a Y shape, and splits the power of incident light from the first split section 70 into the pair of arms 73 and 74. Similarly, the second split section 72 has a Y shape, and splits the power of incident light from the first split section 70 into the pair of arms 75 and 76. The light waves from the second split section 71 propagate through the arms 73 and 74, and the light waves from the second split section 72 propagate through the arms 75 and 76. The pair of arms 73 and 74 introduce the light waves to the second combining section 77, and the pair of arms 75 and 76 introduce the light waves to the second combining section 78.

The second combining section 77 has a Y shape and combines the light waves from the arms 73 and 74 into the first combining section 79. Similarly, the second combining section 78 has a Y shape and combines the light waves from the arms 75 and 76 into the first combining section 79. The first combining section 79 combines the light waves from the pair of sub waveguides 7a and 7b, that is, the second combining sections 77 and 78 into each other, and outputs light output Lout. The optical waveguide 7 is a MZ waveguide as a whole. The first split section 70 and the second split sections 71 and 72 include waveguides respectively having branches formed by curved waveguides shaped into an S shape, for example. Similarly, the first combining section 77 and the second combining sections 78 and 79 include waveguides having branches formed by curved waveguides shaped into an S shape, for example.

The optical modulator 1 includes first and second signal electrodes 82 and 83, ground electrodes 80, 811 and 812, and first through sixth bias electrodes 84 through 89. The first and second signal electrodes 82 and 83, the ground electrode 80 and the first through sixth bias electrodes 84 through 89 are provided on the substrate 6 so as to partially overlap the optical waveguide 7. The electrodes 80 through 89, 811 and 812 are stacked on the substrate 6 so that a buffer layer is interposed in a similar manner to that of the aforementioned embodiments.

The first signal electrode 82 is used to generate an electric field in the pair of arms 73 and 74, and the second signal electrode 83 is used to generate an electric field in the pair of arms 75 and 76. Modulation signals for modulating light are applied to the first and second signal electrodes 82 and 83. The first and second signal electrodes 82 and 83 are formed to extend long the arms 73 and 76, respectively, and overlap with portions of the arms 73 and 76 that continue from the first and second split sections 71 and 72. The both ends of the first signal electrode 82 are curved toward one of the opposite sides of the substrate 6, and the both ends of the second signal electrode 83 are curved toward the other side of the substrate 6.

The first through sixth bias electrodes 84 through 89 are connected to respective DC sources, and are supplied with bias voltages for compensating for a deviation of the operating point of the modulation signal on the characteristic due to temperature change or the like. The first through sixth bias electrodes 84 through 89 extend along the arms 73 through 76, respectively, and overlap with portions of the arms 73 through 76 that continue from the second combining sections 77 and 78. One end of each of the first through sixth bias electrodes 84 through 89 is curved toward the corresponding side of the substrate 6.

The ground electrodes 80, 811 and 812 are set at the ground potential. The ground electrode 80 overlaps with portions of the arms 74 and 75 that continue from the second split sections 71 and 72. The both ends of the ground electrode 80 are curved toward the side of the substrate 6.

The ground electrodes 811 and 812 have rectangular shapes along the opposite sides of the substrate 6. The ground electrodes 80, 811 and 812 are provided on the substrate 6 so that the first signal electrode 82 is interposed between the ground electrodes 80 and 811, and the second signal electrode 83 is interposed between the ground electrodes 80 and 812. The electrodes 80 through 89, 811 and 812 have an electrode structure of a coplanar line type.

The optical waveguide 7 has narrow portions 710, 711, 730, 740, 750 and 760, which are narrower than the other portions. The narrow portions 710, 711, 730, 740, 750 and 760 are provided so as not to overlap the first and second signal electrodes 82 and 83 and the first through sixth bias electrodes 84 through 89.

The narrow portion 710 is provided between the boundary between the first split section 70 and the second split section 71 and a light split point P11. Similarly, the narrow portion 711 is provided between the boundary between the first split section 70 and the second split section 72 and a light split point P21. The widths of the second split sections 71 and 72 gradually decrease toward the narrow portions 710 and 711, respectively. In other words, the second split sections 71 and 72 have tapered portions that are narrower toward the narrow portions 710 and 711. The narrow portions 710 and 711 remove light waves in higher-order modes generated in the first split section 70.

The narrow portion 730 in the arm 73 is provided between a portion of the arm 73 with which the first signal electrode 82 overlaps and another portion with which the bias electrode 84 overlaps. Similarly, the narrow portion 760 in the arm 76 is provided with a portion of the arm 76 with which the first electrode 83 overlaps and another portion with which the bias electrode 87 overlaps. The widths of the arms 73 and 76 gradually decrease toward the narrow portions 730 and 760. In other words, the arms 73 and 76 have tapered portions that are narrower toward the narrow portions 730 and 760.

In a variation of the sixth embodiment, the width of the optical waveguide 7a gradually decreases toward the narrow portion 730, starting from the portion of the optical waveguide 7a with which the first signal electrode 82 overlaps and the portion thereof with which the first bias electrode 84 overlaps. Similarly, the width of the optical waveguide 7b gradually decreases toward the narrow portion 760, starting from the portion of the optical waveguide 7b with which the first signal electrode 83 overlaps and the portion with which the fourth bias electrode 87 overlaps. In other words, the tapered portions that connect to the narrow portion 730 start from the portion of the arm 73 with which the first signal electrode 82 overlaps and the portion thereof with which the first bias electrode 84 overlaps. Similarly, the tapered portions that connected to the narrow portion 760 start from the portion of the arm 76 with which the first signal electrode 83 overlaps and the portion thereof with which the fourth bias electrode 87 overlaps.

The narrow portion 740 in the arm 74 is provided in the position that corresponds to the position of the narrow portion 730 in the length direction. Similarly, the narrow portion 750 in the arm 75 is provided in the position that corresponds to the position of the narrow portion 760 in the length direction. The widths of the arms 74 and 75 gradually narrows toward the narrow portions 730 and 760. In other words, the arms 74 and 75 have tapered portions that are narrower toward the narrow portions 740 and 750.

In a variation of the sixth embodiment, the width of the optical waveguide 7a gradually decreases toward the narrow portion 740, starting from the portion of the optical waveguide 7a with which the second bias electrode 85 overlaps. Similarly, the width of the optical waveguide 7b gradually decreases toward the narrow portion 750, starting from the portion with which the fifth bias electrode 88 overlaps. In other words, the tapered portion that connects to the narrow portion 740 starts from the portion of the arm 74 with which the second bias electrode 85 overlaps. Similarly, the tapered portions that connected to the narrow portion 750 start from the portion of the arm 75 with which the fifth bias electrode 88 overlaps. The narrow portions 730 and 760 have an equal width, and the tapered portions that connect to the narrow portions 730 and 760 have an equal length.

The narrow portions 730 and 740 remove light waves in higher-order modes generated in the second split section 71. The narrow portions 750 and 760 remove light waves in higher-order modes generated in the second split section 72.

With the above structure, the optical quenching ratio of the optical modulator 1 used for multilevel modulations such as DQPSK and the like is improved. In the present embodiment, there is no restriction of the positions of the narrow portions. For example, the narrowed portions may be provided in only one of the pair of arms 73 and 74 and the part of arms 75 and 76, and may be provided in any of the first split section 70 and the second combining sections 77 through 79.

Figure 12:
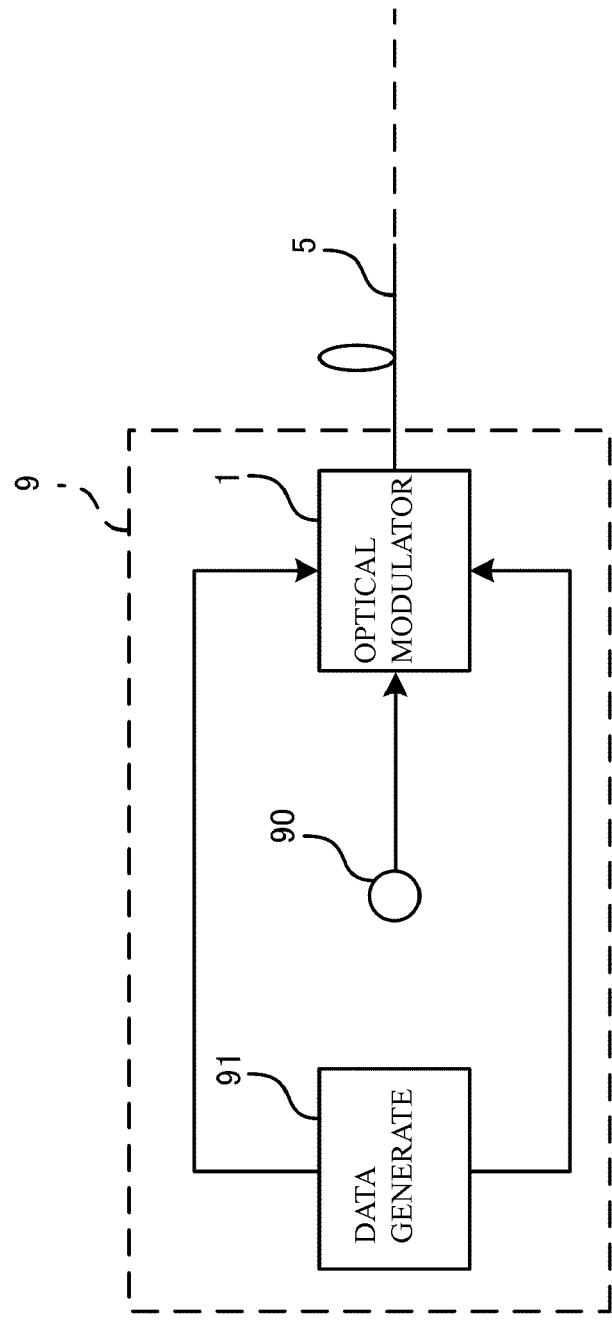
FIG. 12 is a block diagram of an optical transmitter.

A description is now given of an optical transmitter with the above-described optical modulator 1. FIG. 12 illustrates an exemplary structure of the optical transmitter.

An optical transmitter 9 includes the optical modulator, a light source 90 and a data generation unit 91. The light source 90 is, for example, a laser diode, and outputs continuous wave (CW) light to the optical modulator 1 through an optical fiber. The optical fiber that couples the optical modulator 1 with the light source 90 may be any of a single-mode fiber of a multimode fiber.

The data generation unit 91 generates a drive signal based on data that is to be transmitted, and outputs the drive signal to the optical modulator 1. The optical modulator 1 generates the modulation signal S from the drive signal, and modulates light incident to the optical waveguide 2 or 7 from the light source 90. The modulated light is output to an optical fiber coupled to the outlet 29 of the optical waveguide 2 or 7.

The optical transmitter 9 thus configured includes the optical modulator 1 and has the aforementioned functions and effects. The optical transmitter 9 may be provided in a single module together with an optical receiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulator comprising:
   a substrate that has an optical waveguide that includes a split section that splits light into two light waves, a pair of arms through which the light waves propagate, and a combining section that combines the light waves from the pair of arms with each other; and
   an electrode that generates an electric field by a voltage applied to the electrode, wherein
   the optical waveguide has a first waveguide portion and a second waveguide portion,
   the electrode overlaps the first waveguide portion of the optical waveguide; and
   the second waveguide portion of the optical waveguide has a narrow portion that is narrower than the first waveguide portion of the optical waveguide and emits light in higher-order modes to outside of the optical waveguide.

2. The optical modulator according to claim 1, wherein the narrow portion is provided in at least one of the pair of arms.

3. The optical modulator according to claim 1, wherein the waveguide has a portion that gradually narrows toward the narrow portion.

4. The optical modulator according to claim 1, wherein:
   the electrode includes a signal electrode to which a modulation signal for modulating the light is applied, and a bias electrode to which a bias voltage is applied; and
   the waveguide has a portion that gradually narrows toward the narrow portion, starting from at least one of a portion of the optical waveguide with which the signal electrode overlaps and another portion with which the bias electrode overlaps.

5. The optical modulator according to claim 1, wherein:
   the electrode includes a signal electrode to which a modulation signal for modulating the light is applied; and
   the waveguide has a portion that gradually narrows toward the narrow portion, starting from a portion of the optical waveguide with which a portion of the signal electrode on a termination side for the modulation signal overlaps.

6. The optical modulator according to claim 1, wherein the waveguide has a tapered portion that gradually narrows toward the narrow portion.

7. The optical modulator according to claim 1, wherein:
   the narrow portion includes first and second narrow portions respectively provided in the pair of arms,
   the arms have respective tapered portions that gradually narrows toward the first and second narrow portions; and
   the tapered portions of the arms have an equal length.

8. The optical modulator according to claim 1, wherein:
   the narrow portion includes first and second narrow portions respectively provided in the pair of arms, and the first and second narrow portions have an equal width.

9. The optical modulator according to claim 1, wherein:
   the split section includes a pair of input waveguides extending from a light split point to the pair of arms; and
   the narrow portion is provided in at least one of the pair of input waveguides.

10. The optical modulator according to claim 9, wherein the optical waveguide has portions that gradually narrows toward the narrow portion provided in at least one of the pair of input waveguides.

11. The optical modulator according to claim 1, wherein:
    the split section includes a pair of input waveguides extending from a light split point to the pair of arms;
    the narrow portion is provided in at least one of the pair of input waveguides; and
    the at least one of the pair of input waveguides gradually narrows toward the narrow portion, starting from a portion of the optical waveguide with which the electrode overlaps.

12. The optical modulator according to claim 1, wherein:
    the split section includes a pair of input waveguides extending from a light split point to the pair of arms;
    the narrow portion is provided in at least one of the pair of input waveguides; and
    the at least one of the pair of input waveguides has a tapered portion that gradually narrows toward the narrow portion.

13. The optical modulator according to claim 1, wherein:
    the combining section includes a pair of output waveguides that extend from the pair of arms to a light combining point; and
    the narrow portion is provided in at least one of the pair of output waveguides.

14. The optical modulator according to claim 13, wherein the optical waveguide gradually narrows toward the narrow portion provided in the at least one of the pair of output waveguides.

15. The optical modulator according to claim 1, wherein:
the combining section includes a pair of output waveguides that extend from the pair of arms to a light combining point;
the narrow portion is provided in at least one of the pair of output waveguides; and
the at least one of the pair of output waveguides gradually narrows toward the narrow portion, starting from a portion of the optical waveguide with which the electrode overlaps.

16. The optical modulator according to claim 1, wherein:
the combining section includes a pair of output waveguides that extend from the pair of arms to a light combining point;
the narrow portion is provided in at least one of the pair of output waveguides; and
the at least one of the pair of output waveguides has a tapered portion that gradually narrows toward the narrow portion.

17. The optical modulator according to claim 1, wherein:
the substrate includes a pair of waveguides, each of which includes the split section, the pair of arms and the combining section; and
incident light is split into the pair of waveguides and is then combined.

18. An optical transmitter comprising:
a light source; and
an optical modulator including:
a substrate that has an optical waveguide that includes a split section that splits light into two light waves, a pair of arms through which the light waves propagate, and a combining section that combines the light waves from the pair of arms with each other; and
an electrode that generates an electric field by a voltage applied to the electrode, wherein
the optical waveguide has a first waveguide portion and a second waveguide portion,
the electrode overlaps the first waveguide portion of the optical waveguide; and
the second waveguide portion of the optical waveguide has a narrow portion that is narrower than the first waveguide portion of the optical waveguide and emits light in higher-order modes to outside of the optical waveguide.

19. An optical modulator comprising:
a substrate that has an optical waveguide that includes a split section that splits light into two light waves, a pair of arms through which the light waves propagate, and a combining section that combines the light waves from the pair of arms with each other; and
an electrode that generates an electric field by a voltage applied to the electrode, wherein
the optical waveguide has a first waveguide portion and a second waveguide portion,
the electrode overlaps the first waveguide portion of the optical waveguide,
the second waveguide portion of the optical waveguide has a narrow portion that is narrower than the first waveguide portion of the optical waveguide,
the electrode includes a signal electrode to which a modulation signal for modulating the light is applied, and a bias electrode to which a bias voltage is applied; and
the narrow portion is provided in at least one of the pair of arms and is located between an arm portion with which the signal electrode overlaps and another arm portion with which the bias electrode overlaps.

* * * * *